(12) United States Patent
Zhadanov et al.

(10) Patent No.: US 9,146,000 B2
(45) Date of Patent: Sep. 29, 2015

(54) SHAPED WATER SUPPLYING EXTENSION ARM

(71) Applicants: Eli Zhadanov, Brooklyn, NY (US); Sam Zhadanov, Brooklyn, NY (US)

(72) Inventors: Eli Zhadanov, Brooklyn, NY (US); Sam Zhadanov, Brooklyn, NY (US)

( * ) Notice: Subject to any disclaimer, the term of this patent is extended or adjusted under 35 U.S.C. 154(b) by 0 days.

(21) Appl. No.: 13/909,544

(22) Filed: Jun. 4, 2013

(65) Prior Publication Data

US 2014/0352831 A1 Dec. 4, 2014

(51) Int. Cl.
*A47K 3/20* (2006.01)
*F16L 59/135* (2006.01)
*E03C 1/04* (2006.01)

(52) U.S. Cl.
CPC .................. *F16L 59/135* (2013.01); *A47K 3/20* (2013.01); *E03C 1/0408* (2013.01)

(58) Field of Classification Search
CPC .......................................................... E03C 1/06
USPC ....................................................... 4/538–595
See application file for complete search history.

(56) References Cited

U.S. PATENT DOCUMENTS

| | | | |
|---|---|---|---|
| 136,577 A * | 3/1873 | Worswick ..................... | 285/181 |
| 318,790 A * | 5/1885 | Patton ........................... | 285/181 |
| 451,300 A * | 4/1891 | Drew ............................. | 285/47 |
| 608,852 A * | 8/1898 | Goss ............................. | 285/190 |
| 609,283 A * | 8/1898 | Long ............................. | 251/342 |
| 1,150,505 A * | 8/1915 | Diehl ............................. | 340/632 |
| 1,765,693 A * | 6/1930 | Muend ........................... | 285/181 |
| 1,785,095 A * | 12/1930 | Patterson .................... | 285/127.2 |
| 2,188,069 A * | 1/1940 | Walsh ........................... | 285/181 |
| 4,397,050 A * | 8/1983 | Davis et al. ...................... | 4/601 |
| 4,975,993 A * | 12/1990 | Black et al. ....................... | 4/601 |
| 5,372,389 A * | 12/1994 | Tam et al. ...................... | 285/94 |
| 6,336,764 B1 * | 1/2002 | Liu ............................... | 401/289 |
| 6,415,461 B1 * | 7/2002 | Singer ............................ | 4/601 |
| 8,015,632 B2 * | 9/2011 | Haug et al. ........................ | 4/570 |
| 8,156,579 B2 * | 4/2012 | Renfrew .......................... | 4/570 |
| 8,505,567 B1 * | 8/2013 | Wu ............................... | 4/570 |
| 2003/0221251 A1 * | 12/2003 | Tse ............................... | 4/570 |
| 2005/0193487 A1 * | 9/2005 | Watari ............................ | 4/570 |
| 2006/0230521 A1 * | 10/2006 | Haug ............................. | 4/570 |
| 2008/0022450 A1 * | 1/2008 | Tsai ............................... | 4/570 |

* cited by examiner

*Primary Examiner* — Lori Baker
(74) *Attorney, Agent, or Firm* — Henry M. Feiereisen LLC.

(57) ABSTRACT

A water supplying extension arm for supplying water from a water source to a showerhead has an elongated hollow extension arm element extending along its longitudinal axis and having a first end connectable to the water source turnably about a horizontal axis and a second end spaced in a direction of the longitudinal axis from the first end and connectable to the showerhead. The hollow elongated extension arm element is arch-shaped and has a cross section with a shape of an ellipse having a shorter upright axis and a longer transverse axis.

10 Claims, 4 Drawing Sheets

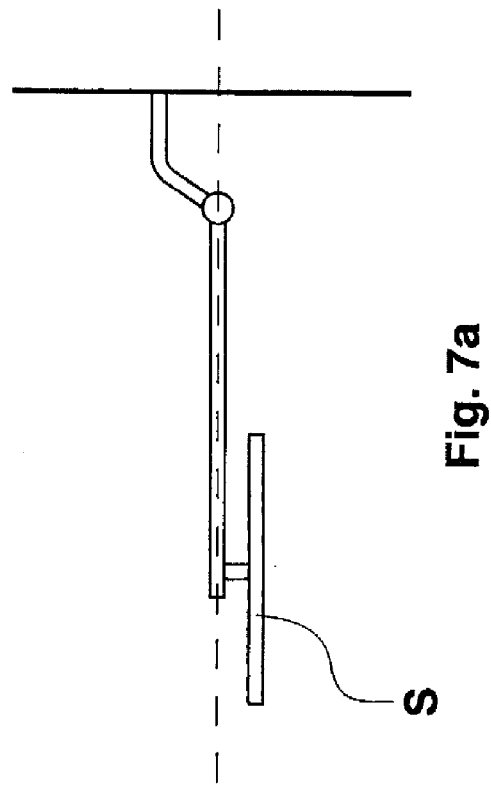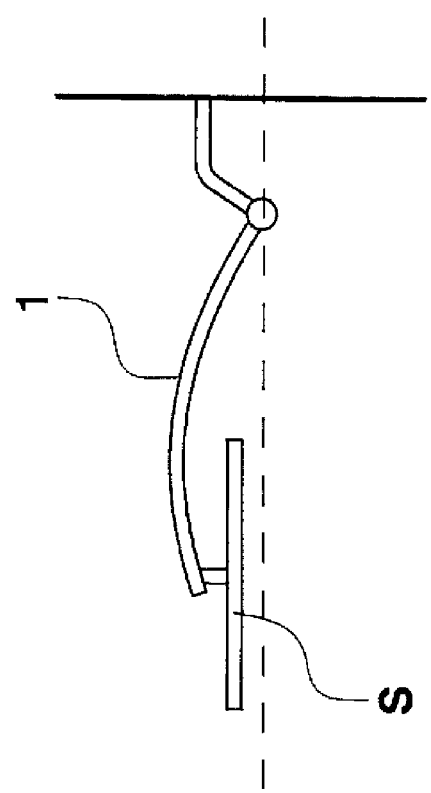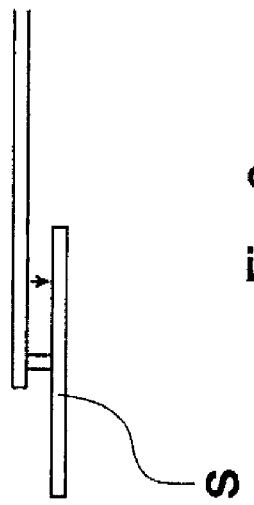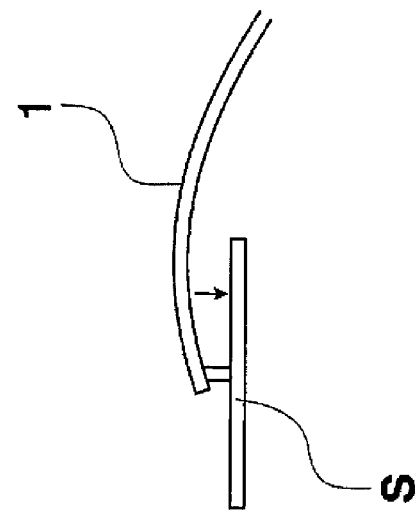

SHAPED WATER SUPPLYING EXTENSION ARM

BACKGROUND OF THE INVENTION

The present invention relates generally to an equipment for supplying water from a source of water, for example from a water pipe, to a showerhead, and more particularly it relates to water supplying extension arms which supply water from the water source to the showerhead.

Water supplying extension arms are used for supporting on them other element of water systems, which can be connected turnably around an axis of the extension arm and slidingly along the extension arm. At the same time the extension arms are hollow and have an inner channel through which water flows from the water source to the showerhead.

The known water supplying extension arms are usually straight and thereby they restrict a movement range of the showerhead and adjustability of the arm and the showerhead and require additional angle adjustment means. They also have a circular cross section which also has its drawbacks, in particular increased material use.

SUMMARY OF THE INVENTION

Accordingly, it is an object of the present invention to provide a water supplying extension arm, which is a further improvement of the existing water supplying extension arms.

In keeping with these objects and with others which will become apparent hereinafter, one feature of the present invention resides, briefly stated, in a water supplying extension arm for supplying water from a water source to a showerhead, which has an elongated hollow extension arm element extending along its longitudinal axis and having a first end connectable to the water source turnably about a horizontal axis and a second end spaced in a direction of the axis from the first end and connectable to the showerhead, wherein the hollow elongated extension arm element being arch-shaped and having a cross section with a shape of an ellipse having a first shorter upright axis and a second longer axis which is perpendicular to the first shorter upright axis such that the showerhead is connectable to the second end of the water supplying extension arm in a position under the second end as considered in the upright direction.

When the elongated hollow extension arm element has an arch shape it allows a greater range of movement of the showerhead and adjustability of the hollow extension arm element and the showerhead without additional adjusting means, and the elliptic shape of its cross section requires less material for manufacture of the arm with the same supporting area for the showerhead as will be explained in detail hereinbelow.

In accordance with a further feature of the present invention the first end of the elongated hollow extension arm element has means for connecting the first end of the elongated hollow extension arm element to the water source turnably about a horizontal axis.

Still a further feature of the present invention resides in that the inventive water supplying extension arm has an inlet insert forming the first end of the elongated hollow extension arm element and connected with a remaining portion of the elongated hollow extension arm element and with the water source, and an outlet insert forming the second end of the elongated hollow extension arm element and connected with the remaining portion of the elongated hollow extension arm element and with the showerhead.

A further feature of the inventive water supplying extension arm resides in that it has a pipe extending inside the elongated hollow extension arm element and having a tubular interior through which water is supplied from the water source to the showerhead.

In accordance with a further feature of the present invention, the pipe has a longitudinal central portion and two opposite end portions provided for a water entry from the water source and a water exit to the showerhead, operatively connected with said inlet insert and said outlet inserts, and clamped between and by said inlet insert and said outlet insert.

The novel features of the present invention are set forth in detail in the appended claims.

The invention itself however will be best understood from the following description of the preferred embodiments, which is accompanied by the following drawings.

BRIEF DESCRIPTION OF THE DRAWINGS

FIGS. 7a, 7b, 8a and 8b are views illustrating the positions of conventional straight water supplying extension arms and of the water supplying extension arm of the present invention and of showerheads connected with them.

DESCRIPTION OF THE PREFERRED EMBODIMENTS

Figure 1:
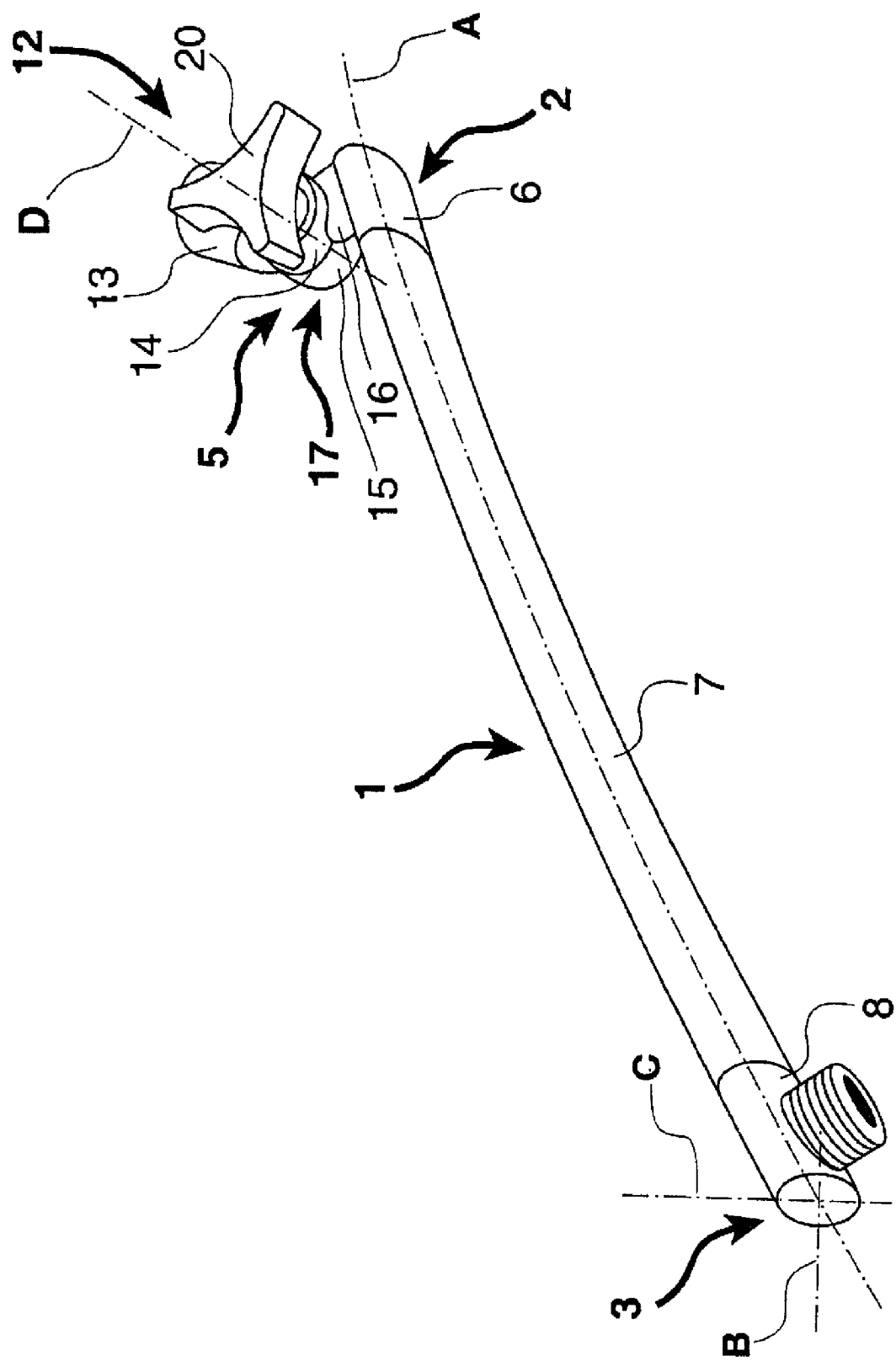
FIG. 1 is a perspective view showing a water supplying extension arm in accordance with the present invention.
Figure 2:
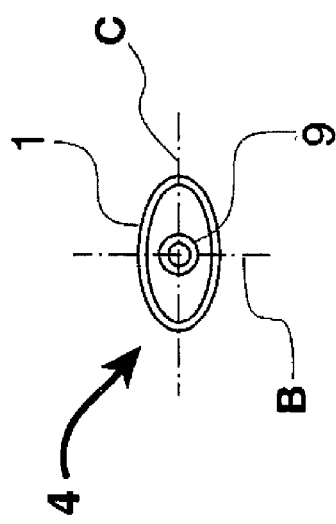
FIG. 2 is a view showing-cross section of an elongated hollow extension arm element of the inventive water supplying extension arm.

A water supplying extension arm in accordance with the present invention has an elongated hollow extension arm element which is identified as a whole with reference numeral 1. The elongated hollow extension arm element 1 extends along an axis A and has a first end 2 connectable to a water source, for example a water pipe, and a second end 3 axially spaced from the first end and connectable with a showerhead.

The elongated hollow extension arm element 1 is arch-shaped, which is highly advantageous for use of the water supplying extension arm by users for taking a shower. As can be seen from FIGS. 8a and 8b the water supplying extension arm with the inventive arch-shaped elongated hollow extension arm element 1 provides a greater range of angle adjustability of a showerhead S relative to the elongated hollow extension arm element 1 than in the case when the elongated hollow extension arm element has a conventional straight configuration. As can be seen from the views of FIGS. 7a and 7b, in the water supplying extension arm with the inventive arch-shaped elongated hollow extension arm element 1, the elongated hollow extension arm element 1 and the showerhead S have a greater height adjustability than in the case of the water supplying extension arm having an elongated hollow extension arm element with a conventional straight configuration (with the same position of the turning hinge), which makes it convenient for taller users.

As can be seen from FIG. 1, the elongated hollow extension arm element 1 is arch-shaped over its whole length from its first end 2 to its second end 3.

Figure 5:
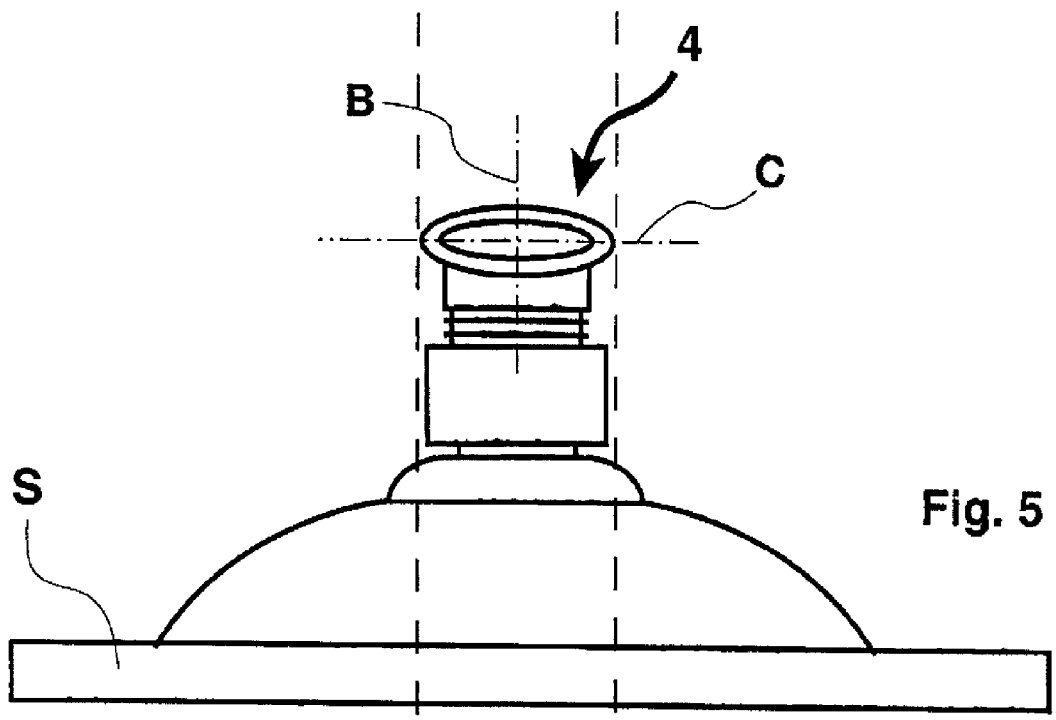
FIGS. 5 and 6 are views showing the water supplying extension arms of the invention and of the prior art with the same dimension in the transverse direction.
Figure 6:
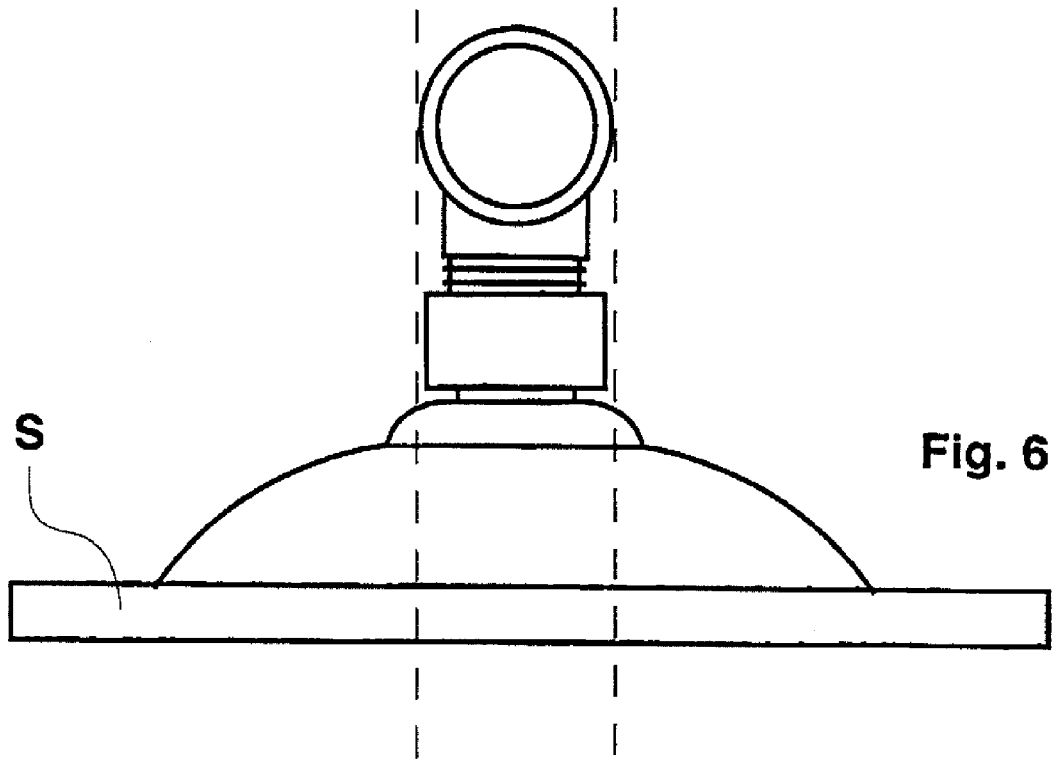

The elongated hollow extension arm element 1 has a transverse cross section 4 which is perpendicular to the axis A and has a shape of an ellipse with a first shorter upright axis B and a second longer axis C which is perpendicular to the first axis. As can be seen from FIGS. 5 and 6, the dimension of the elongated hollow extension arm element 1 in accordance with the present invention in direction of the axis C is the same as the dimension of the conventional round elongated hollow extension arm element and thereby is available for supporting the same showerhead. However, the amount of material which is needed to produce the elliptical elongated hollow extension arm element is significantly lower than is needed to produce the conventional round extension arm element.

The first end 2 of the elongated hollow extension arm element has means 5 for connecting the first end 2 of the elongated hollow extension arm element to the water source to turn around a horizontal axis D, as will be explained hereinbelow.

The water supplying extension arm further has an inlet insert 6 forming the first end 2 of the elongated hollow extension arm element 1 and connected with a remaining portion 7 of the elongated hollow extension arm element and with the water source, and an outlet insert 8 forming the second end 3 of the elongated hollow extension arm element 1 and connected with the remaining portion 7 of the elongated hollow extension arm element 1 and with the showerhead.

Figure 4:
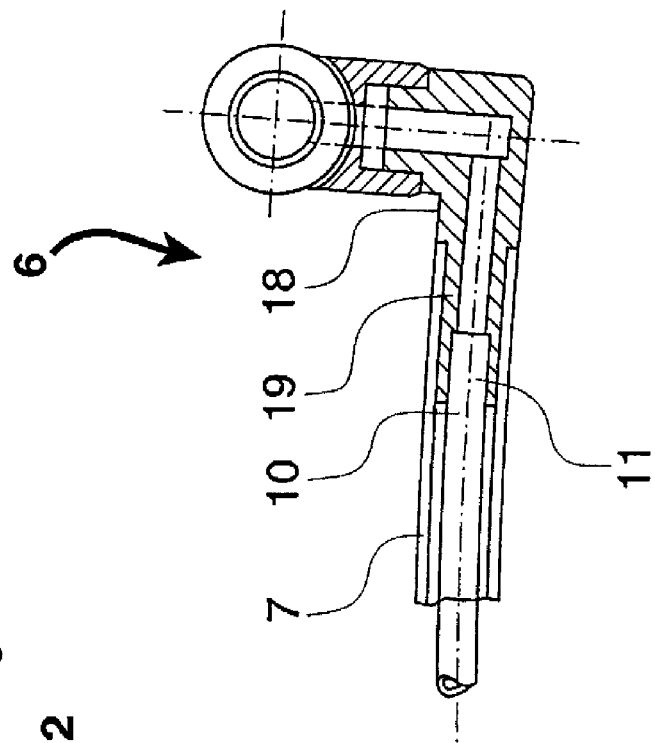
FIGS. 3 and 4 are views showing a water inlet unit and a water outlet unit of the water supplying arm in accordance with the present invention.
Figure 3:
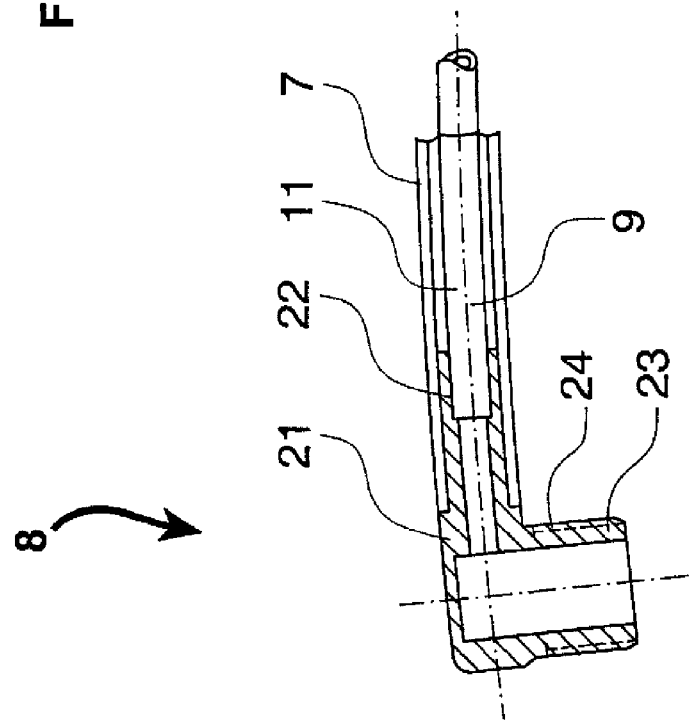

The water supplying extension arm further has a pipe 9 extending inside the elongated hollow extension arm element 1 and having a tubular interior through which water is supplied from the water source to the showerhead as shown in FIGS. 3 and 4. The pipe 9 is composed of a rigid material, such as for example NYLON 6, and is rigid in the longitudinal direction while it can slightly flex in a transverse direction.

The pipe 9 has a longitudinal central portion and two opposite end portions 10 and 11 provided for a water entry from the water source and a water exit to the showerhead. As can be seen from the drawings, the end portions 10 and 11 of the pipe 9 are connected with the inlet insert 6 and the outlet insert 8. In particular the end portions 10 and 11 of the pipe 9 can be inserted into receiving holes of the inlet and outlet inserts 6 and 8, and the pipe 9 is braced between and by the inlet and outlet inserts 6 and 8 to be firmly held in the required position.

The turnably connecting means 5 of the first end 2 of the elongated hollow extension arm element 1 has a first connecting element 12 including an inlet tubular member 13 and a circular member 14 which is turnable about a horizontal axis relative to a circular member 15 provided with a tubular member 16 of a second connecting element 17. The tubular member 16 is a part of the inlet insert 6 which is provided with a portion 18 having a narrower section 19 insertable into the elongated hollow extension arm element 1. A knob 20 connects the connecting elements 12 and 17 with one another and fixes their angular position relative to one another that enables the user to raise or lower the arm and to lock it in a desired position. The turnably connecting means is substantially similar to corresponding means disclosed in our patent application Ser. No. 13/690,059 filed on Nov. 11, 2012 and incorporated here by reference thereto.

The outlet insert 8 has a portion 21 provided with a narrower section 22 insertable into the elongated hollow extension arm element at the second end 3 and also provided with a transverse water outlet portion 23 having for example an outer thread 24 for connection of the showerhead to the second end of the elongated hollow extension arm element.

It is to be understood that the turnable connection of the elongated hollow extension arm element 1 to the water source at one end and the connection of the hollow extension arm element 1 to the showerhead can be constructed in different ways as well.

The present invention is not limited to the details shown since various modifications and structural changes are possible without departing in any way from the spirit of the invention.

What is desired to be protected by Letters Patent is set forth in particular in the appended claims.

The invention claimed is:

1. A water supplying extension arm for supplying water from a water source to a showerhead, comprising an elongated hollow extension arm element extending along its longitudinal axis and having a first end connectable to the water source turnably about a horizontal axis and a second end spaced in a direction of the longitudinal axis from the first end and connectable to the showerhead and supplying water therethrough from the water source to the showerhead, wherein the hollow elongated extension arm element is arch-shaped over its whole length and has a hollow transverse cross section which is perpendicular to the axis and has a shape of an ellipse with a first shorter upright axis and a second longer axis which is perpendicular to the first axis, and an inlet insert forming the first end of the elongated hollow extension arm element and connected with a remaining portion of the elongated hollow extension arm element and with the water source.

2. A water supplying extension arm as defined in claim 1, further comprising an outlet insert forming the second end of the elongated extension arm element and connected with the remaining portion of the elongated hollow extension arm element and with the showerhead.

3. A water supplying extension arm as defined in claim 2, further comprising a pipe extending inside the elongated hollow extension arm element and having a tubular interior through which water is supplied from the water source to the showerhead.

4. A water supplying extension arm as defined in claim 3, wherein the pipe has a longitudinal central portion and two opposite end portion provided for a water entry from the water source and a water exit to the showerhead and connected with said inlet and outlet inserts correspondingly to be braced between and by said inlet and outlet inserts.

5. A water supplying extension arm as defined in claim 3, wherein said pipe is composed of a rigid material.

6. A water supplying extension arm for supplying water from a source to a showerhead, comprising an elongated hollow extension arm element extending along its longitudinal axis and having a first end connectable to the water source turnably about a horizontal axis and a second end spaced in a direction of the longitudinal axis from the first end and connectable to the showerhead and supplying water therethrough from the water source to the showerhead; an inlet insert forming the first end of the elongated hollow extension arm element and connected with a remaining portion of the elongated hollow extension arm element and with the water source; an outlet insert forming the second end of the elongated hollow extension arm element and connected with the remaining portion of the elongated hollow extension arm element and with the showerhead; and a pipe extending inside the elongated hollow extension arm element and having a tubular interior through which water is supplied from the water source to the showerhead, one end of said pipe being connected to said inlet insert and the other end of said pipe being connected to said outlet insert.

7. A water supplying extension arm as defined in claim 6, wherein said one end of said pipe is inserted in a receiving hole of said inlet insert and said other end of said pipe is inserted into a receiving hole of said outlet insert.

8. A water supplying extension arm as defined in claim 6, wherein said pipe is braced between said inlet insert and said outlet insert to be firmly held in its position.

9. A water supplying extension arm as defined in claim 6, wherein said hollow extension arm element is arch-shaped over its whole length and has a hollow transverse cross section which is perpendicular to the axis and has a shape of an ellipse with a first shorter upright axis and a second longer axis which is horizontal and perpendicular to the first axis.

10. A water supplying extension arm as defined in claim 6, wherein said inlet insert has a tubular section which extends perpendicular to said elongated extension arm element and to said pipe.

* * * * *